No. 89,353.    PATENTED APR. 27, 1869.
T. R. SINCLAIRE.
APPARATUS FOR PURIFYING AND RECTIFYING LIQUIDS.
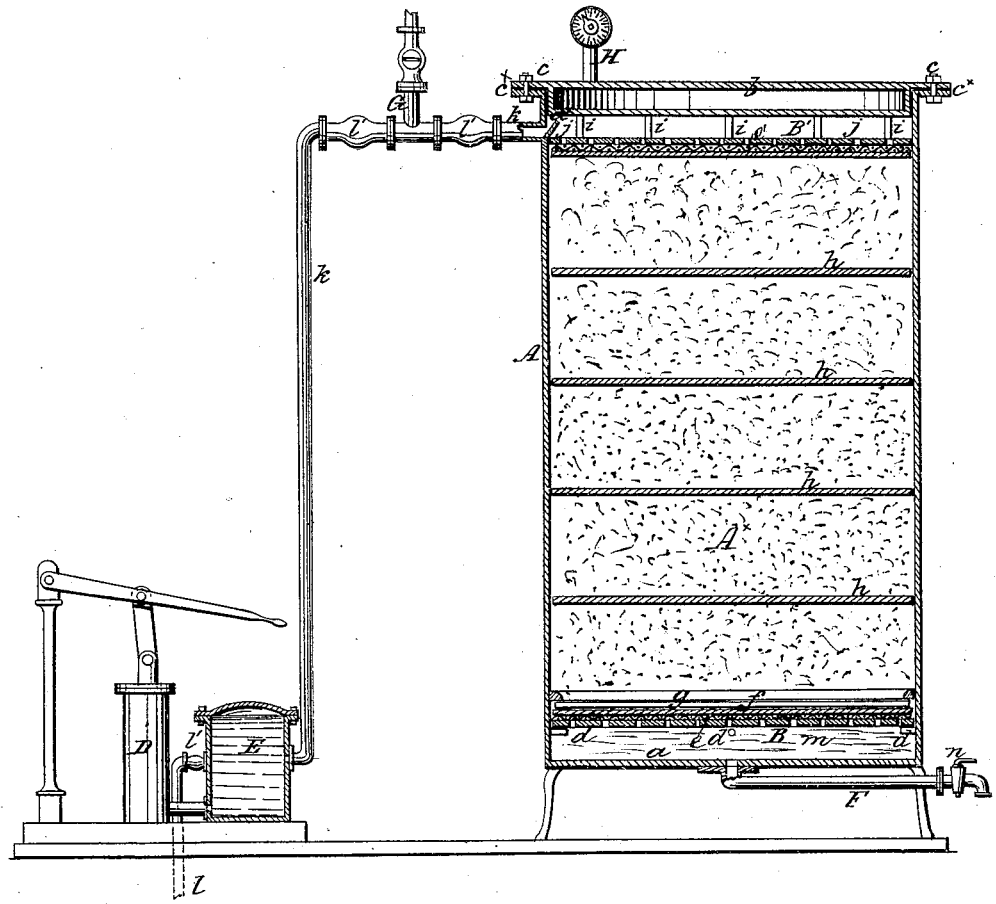
Witnesses.
Enos Alvord
G. M. Ackerman
Inventor.
Thomas R. Sinclaire
pr A. R. H. Caybl
Atty.

UNITED STATES PATENT OFFICE.

THOMAS R. SINCLAIRE, OF NEW YORK, N. Y.

IMPROVED APPARATUS FOR PURIFYING AND RECTIFYING LIQUIDS.

Specification forming part of Letters Patent No. 89,353, dated April 27, 1869.

*To all whom it may concern:*

Be it known that I, THOMAS R. SINCLAIRE, of the city, county, and State of New York, have invented a new and useful Improvement in Rectifying and Clarifying; and I do hereby declare that the following is a full, clear, and exact description of the same, reference being had to the accompanying drawing, and to the letters of reference marked thereon, making a part of this specification.

This invention relates to a new and useful improvement in rectifying and clarifying such liquids as spirits, saccharine juices, and oleaginous fluids.

Hitherto the substances above named have been rectified and clarified, most generally, by what is termed "leaching." This is comparatively a slow process, and, unless large vats are made, to hold a considerable quantity of filtering material, and admit of a large quantity of fluid being placed in them, this mode of rectifying and clarifying would be impracticable. More recently there has been introduced, for the purposes above named, an apparatus, by which the liquid to be operated upon is expedited in its passage through the filtering medium by centrifugal force. This apparatus is expensive to construct and keep in proper working order.

The object of my invention is to expedite the process of rectifying and clarifying, thereby saving time and expense. To effect this, I subject the fluid to be operated upon to a pressure, through the medium of a pump, or its mechanical equivalent, and use, in connection with the same, a vessel containing a rectifying or clarifying medium, all being constructed and arranged in such a manner that the liquid to be operated upon may be forced through the rectifying or clarifying medium with the requisite pressure—say, from one to two hundred pounds to the square inch, and without the liability of the liquid under such pressure cutting passages through the rectifying or clarifying medium.

To enable those skilled in the art to fully understand and practice my invention, I will proceed to describe an apparatus which I have in present use for rectifying whisky.

A, in the accompanying drawing, which represents a vertical central section of the apparatus, is a cylindrical or other suitable shaped vessel, wherein the rectifying or clarifying medium is placed.

This vessel may be constructed of any suitable size, and of cast-iron, or boiler-plates rivetted together. It is provided with a close or tight bottom, $a$, and a removable lid or cover, $b$, which may be secured in position by screw-bolts $c$, and kept tight by a suitable packing, $c^\times$.

In the lower part of the vessel A there is fitted a supplemental bottom, B, which rests on lateral projections or pins $d$. This supplemental bottom is perforated, and upon it there is placed a wire-cloth screen, $e$, and upon the latter a canvas strainer, $f$, which is packed around its edge by a metal ring, $g$, luted or covered with plaster-of-paris or other suitable material, to make a perfect or tight joint. This will be fully understood by referring to the drawing.

On this canvas strainer $f$ the charcoal or other rectifying or clarifying medium $A^\times$ is placed, the body of said medium having within it, if desired, at suitable distances apart, canvas strainers $h$, arranged horizontally.

At the top of the rectifying or clarifying medium there is a canvas strainer, $f'$, wire-cloth screen $e'$, and a perforated plate, B', all of which are kept firmly pressed down upon the rectifying or clarifying medium by the cover $b$ of the vessel A, the plate B' being provided with upright pins $i$ for the cover $b$ to bear upon or against. These pins $i$, it will be seen by reference to the drawing, admit of a chamber, $j$, above the plate B', into which an induction-pipe, $k$, passes, the orifice of said pipe being curved upward in chamber $j$, or having a deflecting-plate, $a^\times$, so arranged as to guide the fluid injected into $j$ in an upward direction.

By this arrangement it will be seen that the fluid will be well distributed over the upper surface of plate B', and prevented from cutting, while under pressure, passages through the rectifying or clarifying medium. The canvas strainers, $f$, $f'$, and $h$, also serve to prevent a direct route of the fluid through the rectifying or clarifying medium, causing the former to be forced quite evenly through the whole mass of the latter.

D represents a force-pump, and E the air-chamber thereof. The fluid to be operated upon is placed into a tank or other vessel, from which it is drawn, and forced by the pump up through pipes *l* and *k* into chamber *j* of the vessel A. Check-valves *l'* are employed in pipes *l* and *k* to prevent any return or back flow of the fluid.

The fluid may be forced through the rectifying or clarifying medium with a greater or less pressure, as desired, and a pressure-gage, H, may be placed on the top of A, by which the pressure of the fluid may be kept uniform, and the exact pressure required given the fluid in its passage through the rectifying or clarifying medium.

What I claim as new, and desire to secure by Letters Patent, is—

The pump D, or its mechanical equivalent, in combination with the filtering-vessel A, constructed and charged substantially as set forth.

THOS. R. SINCLAIRE.

Witnesses:
A. R. HAIGHT,
WM. F. McNAMARA.